Figure 1:
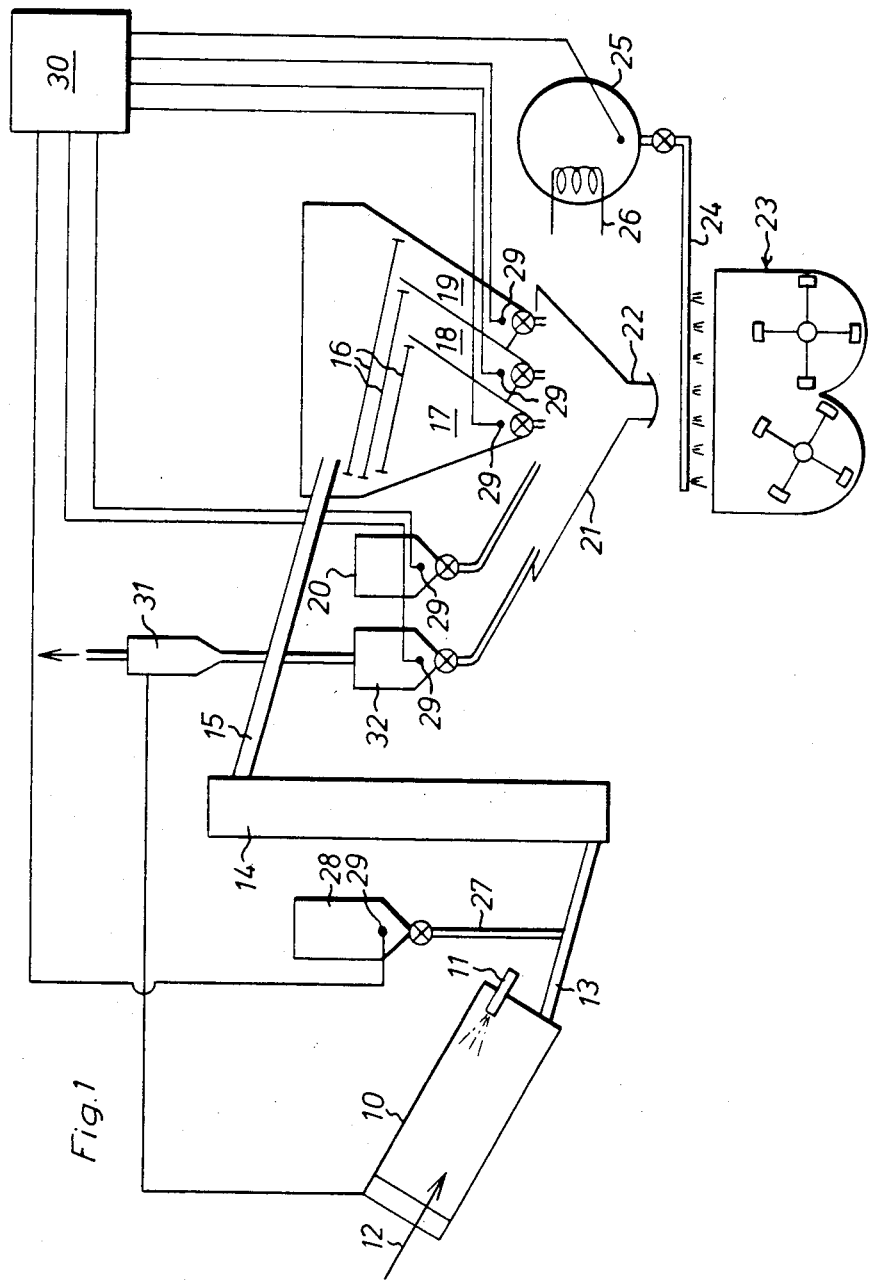

United States Patent [19]
Ohlson

[11] Patent Number: 4,579,458
[45] Date of Patent: Apr. 1, 1986

[54] METHOD AND APPARATUS FOR THE PRODUCTION OF ASPHALT CONCRETE

[76] Inventor: Karl G. Ohlson, Pl 9073, S-281 00 Hässleholm, Sweden

[21] Appl. No.: 486,290
[22] PCT Filed: Aug. 13, 1982
[86] PCT No.: PCT/SE82/00258
§ 371 Date: Mar. 28, 1983
§ 102(e) Date: Mar. 28, 1983
[87] PCT Pub. No.: WO83/00700
PCT Pub. Date: Mar. 3, 1983

[30] Foreign Application Priority Data

Aug. 25, 1981 [SE] Sweden ............................ 8105029
Mar. 5, 1982 [SE] Sweden ............................ 8201390

[51] Int. Cl.⁴ .................................................. B28C 7/04
[52] U.S. Cl. ............................................ 366/8; 366/17; 366/18; 366/23
[58] Field of Search ............... 366/16, 17, 18, 19, 366/21, 8, 22, 23, 24, 25, 33, 37, 39, 40, 64, 65, 66, 144, 145, 147, 148, 151, 152, 154, 177, 181, 297, 606; 106/281 R, 275, 280; 222/54

[56] References Cited

FOREIGN PATENT DOCUMENTS

| 0024513 | 7/1980 | European Pat. Off. |
| 2062358 | 12/1970 | Fed. Rep. of Germany |
| 1140601 | 1/1956 | France |
| 347989 | 12/1970 | Sweden |
| 362382 | 3/1972 | Sweden |
| 417836 | 4/1981 | Sweden |
| 422607 | 3/1982 | Sweden |
| 87923 | 6/1921 | Switzerland |
| 2009758 | 12/1978 | United Kingdom |

OTHER PUBLICATIONS

Derwent's Abstract No. 36238c/20 SU 687161, Official Gazette of Oct. 21, 1930—p. 554.

Primary Examiner—Timothy F. Simone
Attorney, Agent, or Firm—Beveridge, DeGrandi & Weilacher

[57] ABSTRACT

In the batchwise production of asphalt concrete only such aggregate is utilized, as comprises a coarse-grained portion, a fine-grained portion and a filler portion. The coarse-grained portion and the bituminous binder used are mixed in a mixer, and the filler portion is added to the mixer in such a way that it is has been taken up by and suspended in the binder film deposited on the coarse-grained portion before the free particles on the fine-grained portion are added. In such a way the thickness of the binder film and the capability thereof to take up the particles of the fine-grained portion are increased so that also said particles are coated with and suspended in the binder.

An apparatus for carrying the production process into effect has a control device (30) to ensure that the binder film deposited on the particles of the coarse-grained portion has taken up the particles of the filler portion and has thereby obtained the desired thickness and viscosity before the free particles of the fine-grained portion are supplied.

14 Claims, 7 Drawing Figures

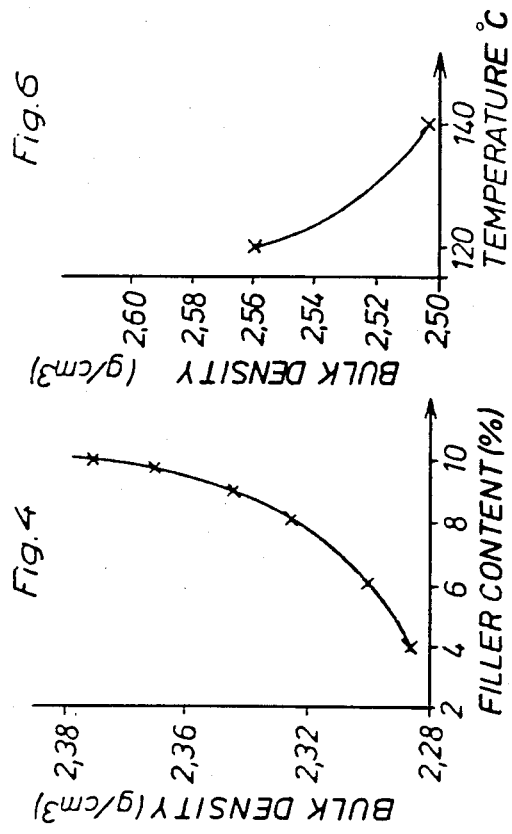

METHOD AND APPARATUS FOR THE PRODUCTION OF ASPHALT CONCRETE

This invention relates to a method and an apparatus for the batchwise production in a mixing plant of asphalt concrete from a bituminous binder tempered into liquid state and particulate aggregate comprising a filler portion, a fine-grained portion and a coarse-grained portion. In the preferred embodiment of the invention the filler portion has a principal particle size effective in applying the invention of below 0.1 mm, the fine-grained portion has a principal particle size effective in applying the invention of below 2 mm and the coarse-grained portion has a principal particle size effective in applying the invention of over 3 mm.

A paving of asphalt concrete on for instance a road must be not only resistant to wear but also elastic so that it can withstand repeated small deformations of the load-carrying foundation without cracking of the asphalt concrete paving. A great deal of research has therefore been spent on establishing suitable proportions between the constituents of the asphalt concrete, suitable material choices and also suitable mixing methods, for it is important that all particles of the aggregate are coated with the bituminous binder or suspended therein in order that a satisfactory elasticity and cohesion shall be obtained. On the other hand, too high binder contents must be avoided because of the high cost of bitumen, because of the risk for bleeding, i.e. sweating of bitumen out of the asphalt concrete at high temperatures, and because of the risk for tracking in road pavings.

One way of effectively utilizing the binding power of the bituminous binder and thus of reducing the required amount of binder in an asphalt concrete is described in Swedish Pat. No. 7016307-6 (Publication No. 347,989). According to the method described therein one first mixes the coarse-grained portion and the bituminous binder to coat the particles of the coarse-grained portion with a bituminous binder film before the remainder of the aggregate is added. This previously known method has brought considerable cost and binder savings while maintaining and in certain cases also improving the characteristics of the asphalt concrete produced.

It has now proved possible to further improved the characteristics of the asphalt concrete to a still higher extent and utilize the binding power of the bituminous binder even more efficiently if the thickness and viscosity of a bituminous binder film deposited on the particles of the coarse-grained portion are increased by introducing the particles of the filler portion into the bituminous binder film in such a way that the free particles of the fine-grained portion when supplied to the mixing plant meet the coarse-grained portion already coated, on the particles of which the binder film has already taken up the particles of the filler portion.

By this production method it is thus possible first to coat the coarse-grained portion with a relatively small amount of binder which, on the particles of the coarse-grained portion, forms a thin binder film which would per se be insufficient to catch and enclose the particles of the fine-grained portion but which after taking up the particles of the filler portion would have acquired a sufficient thickness and viscosity for this purpose. The invention is thus based on the realization that the particles of the filler fraction can be introduced into the binder film and suspended therein so that the filler portion actually will form an integrating part of the bituminous binder which is thereby given increased volume and viscosity and is thus able to take up and also to coat the particles of the fine-grained portion. Under suitable mixing conditions and temperatures it is thus possible, in applying the invention, to ensure that both the filler portion and the fine-grained portion are suspended in the bituminous binder film already deposited on the particles of the coarse-grained portion, which results in an optimum utilization of the bituminous binder supplied and also results in a very homogeneous consistency of the asphalt concrete produced.

As mentioned in the foregoing, it is essential in applying the present invention that the free particles of the fine-grained portion when supplied to the mixer meet coated particles of the coarse-grained portion, the bituminous binder film of which has already been caused to take up filler particles and is thus given greater thickness and higher viscosity. In applying the invention it is therefore possible to pour the entire filler portion into the mixer and mix it homogeneously with the mixture of coarse-grained portion and bituminous binder before the fine-grained portion is added. This supplying sequence gives the best and most reliable result. Within the scope of the invention, however, it is also possible to supply the filler fraction and the fine-grained portions substantially at the same time if these two fractions are added at such points of the mixer that at least the major part of the filler portion has been taken up by the bituminous binder film on the particles of the coarse-grained portion before said particles meet the free particles of the fine-grained portion supplied. It is also possible, within the scope of the invention, to introduce the entire or part of the filler batch into the mixer together with the coarse-grained portion.

Exploiting the present invention it is also possible to control the production of the asphalt concrete in a more exact and even better way than hitherto if the filler portion supplied and/or the temperature of said filler portion and/or the temperature of the coarse-grained portion supplied is regulated to thereby regulate the viscosity of the binder film deposited on the particles of the coarse-grained portion so that it will be the most suitable viscosity in order that the binder film shall be able to take up the particles of the fine-grained portion and enclose them in suspended state. It is also possible to regulate the viscosity of the asphalt binder when it is supplied by adding different asphalt binder types or by regulating the mixing ratio of different asphalt binder types or by regulating the temperature of the binder. To this end, there may be provided in the asphalt plant supplying and dosing means for preheated and not preheated filler portion and for preheated and not preheated mineral aggregate as well as control means for controlling said supplying and dosing means in dependence on the desired viscosity of the bituminous binder film on the particles of the coarse-grained portion. This embodiment of the invention may also be exploited to provide in situ heating of the filler portion supplied, the excess heat of the particles of the coarse-grained portion and/or the preheated bituminous binder being utilized for heating the filler portion.

It should be mentioned in this context that experiments have shown that adding the fine-grained portion to the previously bitumen-coated coarse-grained portion before the filler portion is added results in a reduced thickness of the bituminous binder film on the particles of the coarse-grained portion since the binder film is not sufficiently thick and has not sufficiently high viscosity to take up and wholly enclose the free particles of the fine-grained portion and since the bituminous binder will thereby be distributed over a larger free particle surface (i.e. the total surface area of the particles of the coarse-grained portion and the fine-grained portion). In conventional production processes said insufficient coating has been counteracted by an increase of the amount of bituminous binder supplied, which actually involves increased costs and in many cases also to a lower extent optimum characteristics of the asphalt concrete produced. Those skilled in the art will therefore realize the importance of the thickness increase and viscosity increase of the binder film on the particles of the coarse-grained portion attained by utilizing the present invention. Thus the invention makes possible a volume increase, performed in the mixer, of the bituminous binder so that the binder, without necessitating an increase of the amount of bituminous binder supplied, will be enabled to take up and suspend in it the particles of the fine-grained portion. The binder which is hereby given the form of a suspension of solid particles in a matrix of bitumen, would seem to act, in applying the invention, as a viscous liquid.

As is well known, filler occurs in three different ways in a conventional asphalt plant in which the aggregate is heated and dried, viz. (i) the filler amount accompanying the coarse-grained and fine-grained portions of the heated and dried aggregate, (ii) the filler separated with the aid of cyclone separator or like means in the heating installation of the asphalt plant, and (iii) foreign filler which is added besides the two first-mentioned filler amounts. The foreign filler as a rule has the same temperature as ambient air while the cyclone-separated filler as a rule can have a temperature of up to 100° C. in the normal operation of the plant. At the start-up of the asphalt plant the cyclone-separated filler which is kept stored in silos, may also have ambient temperature. Exploiting the present invention, there is understood by "filler portion" only foreign filler and filler separated in the asphalt plant, while the filler remaining in the coarse-grained portion and fine-grained portion and possibly the filler added to the fine-grained portion are considered to be parts of the respective portion.

It has been found that a varying and low filler temperature may give undesired variations in the capability of the bitumen film deposited on the particles of the coarse-grained portion of taking up and encapsulating further particles from the fine-grained or filler portions. It is therefore essential that the temperatures in the asphalt plant are carefully controlled so that also when large amounts of filler and fine-grained portions are supplied, there is maintained a viscosity of the bituminous binder film on the particles of the coarse-grained portion sufficiently low to permit the particles supplied to penetrate into and be taken up by said bituminous binder film, but still sufficiently high to retain them in suspension. Many existing, conventional asphalt plants have an open-pan mixer with two spaced parallel agitator shafts which rotate in opposite directions and also convey the mass in opposite directions so that the mass during the mixing process is moved downwards in two streams at the opposite long sides of the pan, said streams meeting at the bottom midway between the shafts. In such asphalt plants it is customary for the fine-grained portion to be supplied at one long side and the filler portion at the other long side of the pan. If the filler portion in such an asphalt plant is admitted at the same time as the fine-grained portion the materials meet at the bottom of the pan before the filler has been taken up the binder films on the particles of the coarse-grained portion. This actually implies that the filler when the streams of material meet at the bottom of the mixing pan, has temporarily saturated the binder films on the particles of the coarse-grained portion and that the particles of the fine-grained portion cannot therefore be taken up by the binder films but go on being loose particles. This phenomenon has a disturbing effect on the characteristics of the future asphalt concrete mix, and the mix will be dry and hard. In conventional plants it has therefore been necessary to increase the amount of bituminous binder supplied in order to counteract this problem. As mentioned in the foregoing the present invention resides in the realization that one must regulate the thickness and viscosity of the bituminous binder film deposited on the particles of the coarse-grained portion to permit utilizing the binder supplied in an optimum manner and cause it to catch and take up the supplied fine-grained portion. The invention therefore also relates to an apparatus for the batchwise production of asphalt concrete, said apparatus being characterised by the features defined by claim 6. In such an apparatus according to the invention use is thus made of a control device, for instance a programmed computer, for controlling the dosing means and the supply of materials to the mixing plant so that the free particles of the fine-grained portion added, when supplied to the mixer, will meet the coarse-grained portion already coated, on the particles of which the bituminous binder film has already taken up the particles of the filler portion. The control device is preferably also arranged to regulate the amount of filler portion supplied and/or the temperature of the filler portion supplied, in dependence on the viscosity of the bituminous binder film deposited on the particles of the coarse-grained portion.

To prevent that the binder films on the particles of the coarse-grained portions are temporarily saturated with the particles of the filler portion, when the fine-grained portion gets into touch with the binder-coated particles of the coarse-grained portion, the control device may be adapted to provide an addition of the entire filler portion to the mixer before the addition of the fine-grained portion is started. To the same end, the mixer and the supply means thereof, which are connected with the dosing means, may be so designed that the filler portion and the fine-grained portion are supplied at such points of the mixer that at least the major part of filler portion has been taken up by the binder film on the particles of the coarse-grained portion before said particles meet the free particles of the fine-grained portion supplied.

When the fine-grained portion is produced in a mixing plant, the particles thereof are separated by means of a screen having a mesh width of approximately 3-4 mm. This will give a fine-grained portion substantially having a particle size of 2 mm and less. The choice of screen is dependent on the material flow over the screens and the type of screening device. The flow may be 80–600 tons/h. A presence, if any, of a minor portion of large particles in the fine-grained portion does not take away the effect of the particles less than 2 mm which are always present in the fine-grained portion and effective in applying the invention.

One object of the invention is to produce an asphalt mix the characteristics of which preferably agree with those of a mastic asphalt mix as to composition and elastic and self-healing properties. The method and apparatus according to the invention for supplying the different materials to the mixer have been adapted with the aid of a new measuring method for measuring the characteristics of the asphalt mix compared with those of the mastic asphalt. This measuring method which is described in more detail in the following, measures on the one hand the temperature of decomposition (ToD) of an asphalt concrete test specimen, and on the other hand the deformation of the same test specimen before it reaches the temperature at which it cracks. The method expresses the properties of the mix in the following way:

(1) For mixes conventionally mixed ToD is approximately 200°–210° C. without any deformation of the test specimen. The fracture is relatively dry.

(2) For mixes having a conventional filler content but mixed in accordance with the invention, ToD is 150°–180° C. The fracture is relatively rich in bituminous binder.

(3) For mixes having a high filler content and mixed in accordance with the invention, ToD is 225°–250° C. When ToD is measured on mixes which have been mixed in accordance with the invention and have a high filler content, a deformation of the test specimen begins at approximately 180° C. because the binder, which is a suspension, passes into liquid state. The deformation increases with increasing oven temperature. This can be compared with a mastic asphalt which is in a liquid state at 190°–200° C. Exploiting the present invention it would therefore seem possible, whenever mixing is done, to ensure that the binder which is in the state of a suspension has a sufficiently large volume in the mix in order that the measurable properties of the mix may be expressed in viscous state.

The invention will be described more in detail below with reference to the accompanying drawings in which:

FIG. 1 shows a diagrammatic example of an apparatus according to the invention, and FIGS. 2–7 show various diagrams for elucidating the effect of the invention.

The apparatus according to the invention shown by way of example in FIG. 1 has a heating drum 10 which is heated by means of a burner 11 and supplied with aggregate (mineral aggregate) through an inlet 12. From the heating drum an outlet 13 leads to the lower end of a bucket elevator 14 the outlet 15 of which opens above a set of screens 16. The screens divide the mineral aggregate into different portions which are collected in bins 17, 18 and 19. The exhaust gases from the heating drum 10 are passed to a cyclone 31 and the outlet thereof for separated dust (which is used as filler) is connected to a hot filler bin 32. There is also a bin 20 for separately supplied filler material. Each of the various bins is provided at its lower end with a controllable feed opening which opens above a weighing device 21 having an openable emptying socket 22. Below said socket is placed the open pan mixer 23 of the apparatus, which is of the above-mentioned conventional type having two shafts rotating in opposite directions and provided with agitator blades. Besides there is mounted above the mixer a diffuser pipe 24 which is connected with a supply container 25 for bituminous binder heated into liquid state. For the heating of the bituminous binder and the control of the temperature thereof a heating coil 26 is provided in the supply container 25. A feed pipe 27 from a mineral aggregate bin 28 with controllable discharge opening opens into the outlet pipe 13 from the heating drum 10. The mineral aggregate bin 28 contains non-heated mineral aggregate.

Temperature sensors 29 are arranged in the various bins 17–20, 28 and 32, the supply container 25 and the outlet pipe 13 upstream of its connection with the feed pipe 27. The temperature sensors 29 are connected with a computer 30 serving as a control device. The computer 30 is also connected with the discharge doors of the bins 17–20, 32 and with the discharge door of the supply bin 28, with the weighing device 21 and its discharge door 22, with a control valve in the diffuser pipe 24 and with a control device for the heating coil 26.

With the use of the apparatus according to the invention the streams of material to the mixer and the relative proportions of said streams are controlled with the aid of the computer 30 so that the particles of the coarse-grained portion will be coated with a bituminous binder film which already in suspension contains the filler particles and has a suitable thickness and viscosity in order that the particles of the fine-grained portion, when said fine-grained portion is supplied, shall be taken up and retained by said binder film. The computer thus processes the measured values sensed and adjusts them to preprogrammed mixing proportions. If need be, the mixing proportions are modified in order that the binder films on the particles of the coarse-grained portion shall have the most suitable thickness and viscosity when the fine-grained portion is supplied and encounters said particles. The temperature and viscosity control may take place by certain reproportioning and/or by supply of non-heated mineral aggregate from the aggregate bin 28. But one aggregate bin 28 is shown, but the apparatus may have several such aggregate bins for dosing cold mineral aggregate fractions in adjusted proportions.

The computer 30 can thus be programmed to provide a certain reproportioning by a change of the filler content, by a change of the content of fine-grained portion and/or by a change of the asphalt content, and also to provide a change of the temperature of the mineral aggregate (supply of non-heated mineral aggregate for compensation of temporary excess heating in the heating drum 10) and to provide a change of the filler temperature (supply of a large or small amount of non-heated foreign filler or a large or small amount of cyclone-separated filler). All of these control possibilities with the aid of the computer thus aim at providing any desired viscosity of the bituminous binder film deposited on the particles of the coarse-grained portion before the fine-grained portion gets into touch with said coated particles.

In the following examples use is made of a newly developed measuring method for judging the elasticity and self-healing properties of an asphalt concrete. In this measuring method the so-called temperature of decomposition (ToD) is determined. Measuring is performed on Marschall test specimens (diameter 10 cm, height 6 cm) which are placed in an oven tempered to 100° C. After 30 minutes tempering of the test specimens the temperature in the oven is increased in steps of 25° C. until the test specimens decompose. The decomposition of the test specimens occurs suddenly, and the prevailing oven temperature at the time of decomposition is recorded. In experiments made the temperature of decomposition was in the range of 100°–250° C. Rising values of the temperature of decomposition show that the asphalt concrete becomes harder and displays decreasing elastic and selfhealing properties. ToD-values of 150°–180° C. are at present considered as the most suitable. Exploiting the present invention, it is possible to produce asphalt concrete mixes of predetermined ToD-values since it has been found that the filler content and the filler temperature as well as the fines temperature have a very strong effect on the temperature of decomposition in the production method according to the present invention.

EXAMPLE 1

In this Example use was made of a bituminous binder having a penetration of 180/200 mm/10 for the production of an asphalt concrete of quality MAB 16, i.e. medium hard asphalt concrete with a mineral aggregate size of 0–16 mm. The mineral aggregate was divided into a coarse-grained portion, the particles of which mainly had a particle size of over 2 mm, a fine-grained portion, the particles of which mainly had a particle size of less than 2 mm, and a filler portion, the particles of which mainly had a particle size of less than 0.1 mm.

The production was carried out in a laboratory asphalt concrete mixer which was first supplied with the coarse-grained portion and the bituminous binder which was heated to 150° C. Then the filler portion was added, which was thoroughly admixed before the fine-grained portion was added. Also the filler and fine-grained portions had been heated to 150° C.

In experiments A-D batches of 500 g bituminous binder, 6712 g coarse-grained portion and 2198 g fine-grained portion were used, while the filler amounts in experiments A and B were 590 g and in experiments C and D 820 g. This gave a composition of 5% binder, 5.9% filler, 21.98% fine-grained portion and 67.12% of coarse-grained portion in the test specimens of experiments A and B, and the composition 4.89% binder, 8.02% filler, 21.49% fine-grained portion and 65.60% coarse-grained portion in the test specimens of experiments C and D. The only variable thus was the supplied amount of filler.

Measuring the temperature of decomposition it was established that the increased filler content in test specimens C and D gave an increase of the temperature of decomposition, i.e. the asphalt concrete had become harder. The measured values of the various test specimens were A=175° C., B=173° C., C=190° C. and D=185° C. The results are shown in the form of diagrams in FIG. 2, which have also been confirmed by a long test series.

EXAMPLE 2

In this Example the effects of the filler and mineral aggregate temperatures on the temperature of the composition were examined. For the experiment use was made of the same material composition as for the test specimen A in Example 1.

Four test specimens E-H were made. As for the test specimens E and F the filler temperature only was varied, while as for test specimens G and H the temperature of the mineral aggregate portion only was varied. Otherwise the other materials had a temperature of 150° C. at the mixing thereof. The filler temperature was 60° C. and 150° C., respectively, in experiments E and F, while the temperature of the coarse-grained and fine-grained portions was 125° C. in experiment G and 160° C. in experiment H.

The temperatures of decomposition of the four test specimens were E=168° C., F=195° C., G=155° C. and H=173° C. The result is shown in the form of a diagram in FIG. 3, which is also confirmed by a long test series.

As will appear from this experiment the temperature of decomposition can be influenced by a change of the temperature of the materials supplied. An increase of the mineral aggregate temperature results in an increase of the temperature of decomposition.

EXAMPLE 3

In this Example a series of experiments was carried out to establish how the bulk density of the asphalt concrete mix produced by the method according to the invention was influenced by the filler content, the mixing temperature and the penetration of the bituminous binder. The asphalt concrete produced was proportioned so as to have a medium hard quality MAB16 as in Examples 1 and 2.

In the series of experiments shown in FIG. 4 use was made of a mineral aggregate having a lower true density than in the series of experiments shown in FIGS. 5, 6 and 7. Otherwise, conditions were the same and only the variable indicated in the various FIGS. 4–7 was varied.

As will appear from FIGS. 4 and 5 an increase of the filler content gave an increase of the bulk density, which shows that the binder films on the particles of the coarse-grained portion became thicker (and also obtained a higher viscosity) at the supply of more filler. An increase of the mixing temperature from 120° C. to 140° C. according to FIG. 6 gave a decrease of the bulk density when all other conditions were the same. When the type of bituminous binder was varied (FIG. 7) an increase of the bulk density was obtained on changing over to a harder bituminous binder, i.e. at a successive lowering of the penetration of the bituminous binder.

The Examples accounted for above show that an asphalt concrete produced in accordance with the invention approximately agrees with a poured asphalt in regard of viscous properties and that it is therefore possible to carry out various series of experiments to establish empirically how the asphalt concrete is influenced by a variation of various parameters so that it is possible on the basis of the results of these experiments to program the computer comprised in the apparatus according to the invention so that the computer modifies the filler content and temperature and other variables during the production process, whereby the contemplated asphalt concrete quality is obtained.

I claim:

1. A method for the batchwise production of asphalt concrete comprising providing a bituminous binder heated to liquid state and particulate aggregate, the aggregate being divided into a coarse-grained portion, a fine-grained portion and a filler portion and at least the coarse-grained portion and preferably also the fine-grained portion being preheated before the admixture with the bituminous binder, in which method mixing of the bituminous binder and the aggregate is carried out in a mixer by first introducing the coarse-grained portion and the bituminous binder into the mixture to coat the particles of the coarse-grained portion with a bituminous binder film before the admixture of the remaining aggregate, further comprising increasing the thickness and viscosity of the bituminous binder film deposited on the particles of the coarse-grained portion by introducing the particles of the filler portion into the bituminous binder film in such a way that the free particles of the fine-grained portion when supplied to the mixer meet the coarse-grained portion already coated, on the particles of which the bituminous binder film has already taken up the particles of the filler portion.

2. A method as claimed in claim 1, further comprising regulating the viscosity of the bituminous binder film deposited on the particles of the coarse-grained portion by regulation of the amount of filler portion supplied and/or the temperature of the filler portion supplied.

3. A method as claimed in claim 1, further comprising pouring the entire filler portion into the mixer before the addition of the fine-grained portion is started.

4. A method as claimed in claim 1, further comprising supplying the filler portion and the fine-grained portion at such points of the mixer that at least the major part of the filler portion has been taken up by the binder film on the particles of the coarse-grained portion before said particles meet the free particles of the fine-grained portion supplied.

5. A method as claimed in claim 1, further comprising proceeding in such a way when dividing up the aggregate that the coarse-grained portion is caused to consist mainly of particles having a particle size of over 3 mm, the fine-grained portion is caused to consist mainly of particles having a particle size of below 2 mm and the filler portion is caused to consist mainly of particles having a particle size of below 0.1 mm.

6. An apparatus for the batchwise production of asphalt concrete from a bituminous binder heated to liquid state and a particulate aggregate comprising a filler portion, preferably of a particle size of below 0.1 mm, a fine-grained portion, preferably of a principal particle size of below 2 mm, and a coarse-grained portion, preferably of a principal particle size of over 3 mm, said apparatus comprising heating means (11) for the bituminous binder and for at least the coarse-grained portion and the fine-grained portion and preferably also for the filler portion, a mixing plant (23), dosing means for the various components, temperature sensors (29) for sensing the temperatures of the various aggregate proportions, sensors (29) for the temperature or viscosity of the bituminous binder and a control device (30) for controlling the dosing means in dependence on the desired proportioning of the components of the asphalt concrete, wherein the control device (30) is adapted to control the dosing means and the supply of materials to the mixing plant to coat the particles of the coarse-grained portion with a bituminous binder film and increase the thickness and viscosity of said film by introduction of the particles of the filler portion into the bituminous binder film in such a way that the free particles of the fine-grained portion when supplied to the mixer (23) meet the coarse-grained portion already coated, on the particles of which the bituminous binder film has already taken up the particles of the filler portion.

7. An apparatus as claimed in claim 6, further comprising the control device (30) is adapted to control the amount of the filler portion supplied and/or the temperature of the filler portion supplied in dependence on the viscosity of the bituminous binder film deposited on the particles of the coarse-grained portion.

8. An apparatus as claimed in claim 6, further comprising the control device (30) is adapted to provide an addition of the entire filler portion to the mixer (23) before the addition of the fine-grained portion is started.

9. An apparatus as claimed in claim 6, further comprising the mixer (23) and the supplying means thereof which are connected with the dosing means, are so designed that the filler portion and the fine-grained portion are supplied at such points of the mixer that at least the major part of the filler portion has been taken up by the binder film on the particles of the coarse-grained portion before said particles meet the free particles of the fine-grained portions supplied.

10. The apparatus as claimed in claim 6, further comprising wherein control device (30) includes a plurality of temperature sensors located in the means for providing the aggregate and located in the mineral aggregate bin and filler bin and the bin which contains the bituminous binder, measuring the temperature values and determining mixing proportions based on predetermined calculations so that the mixing proportions are modified in order that the binder films on the particles of coarse-grained aggregate have the most suitable thickness and viscosity when the fine-grained portion is supplied.

11. The apparatus as claimed in claim 10 which further comprises means for control of temperature and viscosity by reproportioning the supply of mineral aggregate from the source of aggregate.

12. A method for the batchwise production of asphalt concrete comprising
providing a bituminous binder heated to the liquid state and particulate aggregate, the aggregate being divided into a coarse-grained particle portion, a fine-grained particle portion and a filler particle portion,
mixing the bituminous binder and the aggregate by first introducing the coarse-grained aggregate portion and the bituminous binder into a mixing zone to coat the particles of the coarse-grained portion with a bituminous binder film before admixture with the remaining aggregate,
at least the coarse-grained portion of which aggregate is preheated before the admixture with the bituminous binder,
increasing the thickness and viscosity of the bituminous binder film deposited on the particles of said coarse-grained portion by introducing at least part of said filler portion into the bituminous binder film prior to introduction of said particles of the fine-grained portion into said binder whereby when said fine-grained portion is supplied to the mixing zone containing the binder coated coarse-grained portion, the particles of said coarse-grained portion being coated with bituminous binder film that has already taken up particles of the filler portion.

13. The method as claimed in claim 12 further comprising wherein the fine-grained particle portion is preheated before admixture with the bituminous binder.

14. The method as claimed in claim 12 which further comprises measuring the temperature of decomposition of the asphalt concrete so obtained and comparing it with a standard and monitoring the proportions of the binder and aggregate to obtain the desired temperature of decomposition.

* * * * *